United States Patent [19]

Thedford et al.

[11] Patent Number: 4,928,459
[45] Date of Patent: May 29, 1990

[54] AIR SYSTEM FOR A COTTON HARVESTER

[75] Inventors: Guy N. Thedford, Naperville; Gary L. Wells, Downers Grover, both of Ill.

[73] Assignee: J. I. Case Company, Racine, Wis.

[21] Appl. No.: 329,001

[22] Filed: Mar. 27, 1989

[51] Int. Cl.$^5$ ............................................. A01D 46/10
[52] U.S. Cl. ........................................ 56/13.3; 56/32; 56/41
[58] Field of Search .................. 56/12.1, 13.3, 30, 31, 56/32, 41, 50, DIG. 8

[56] References Cited

U.S. PATENT DOCUMENTS

| | | | |
|---|---|---|---|
| 3,114,227 | 12/1963 | Morkoski et al. | 56/12 |
| 3,378,309 | 4/1968 | Copley et al. | 302/17 |
| 3,401,510 | 9/1968 | Hubbard | 56/30 |
| 3,427,791 | 2/1969 | Hubbard | 56/41 |
| 3,464,191 | 9/1969 | Copley et al. | 56/12 |
| 3,515,437 | 6/1970 | Copley et al. | 302/59 |
| 4,501,112 | 2/1985 | Thedford et al. | 56/13.3 |
| 4,660,359 | 4/1987 | Deutsch | 56/13.3 |
| 4,821,497 | 4/1989 | Deutsch et al. | 56/30 |

FOREIGN PATENT DOCUMENTS 0738542  6/1980  U.S.S.R. ............................... 56/32

Primary Examiner—Stephen J. Novosad
Assistant Examiner—Terry Lee Melius
Attorney, Agent, or Firm—Dressler, Goldsmith, Shore, Sutker & Milnamow, Ltd.

[57] ABSTRACT

An air system for a cotton harvester having a harvester mechanism including a doffer assembly which forcibly directs doffed cotton toward a discharge compartment arranged on the cotton harvester. The air system of the present invention provides an elongated member which directs a stream of air rearwardly from the doffer assembly in a manner inhibiting doffed cotton from repeating around the doffer assembly. The air system of the present invention further contemplates directing a column of air downwardly behind the doffer assembly to positively evacuate an upper end of the discharge compartment and inhibit rebounding cotton from repeating around the doffer assembly. The air system of the present invention is especially useful for handling of harvested cotton in damp or high yield cotton conditions.

12 Claims, 2 Drawing Sheets

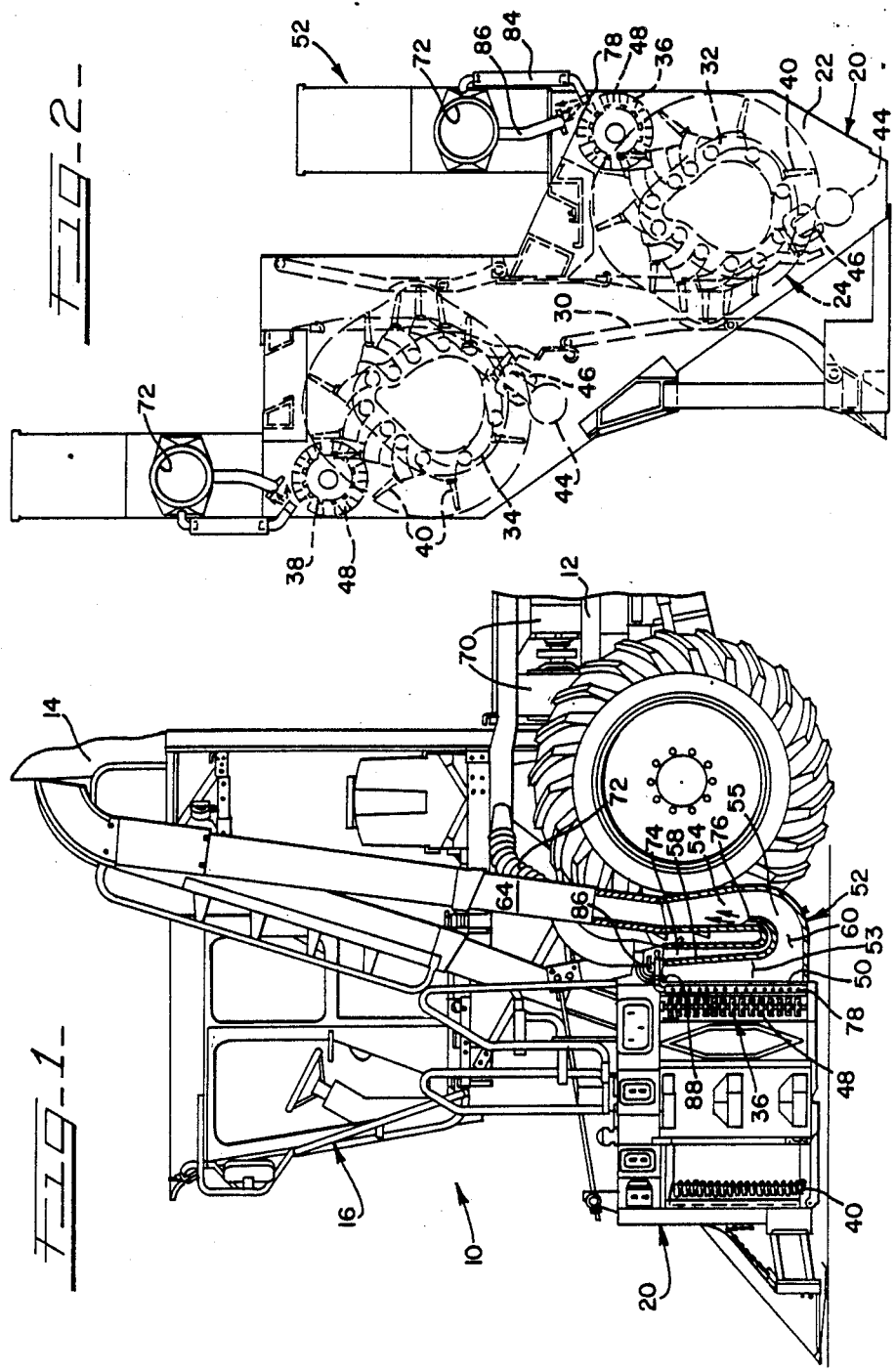

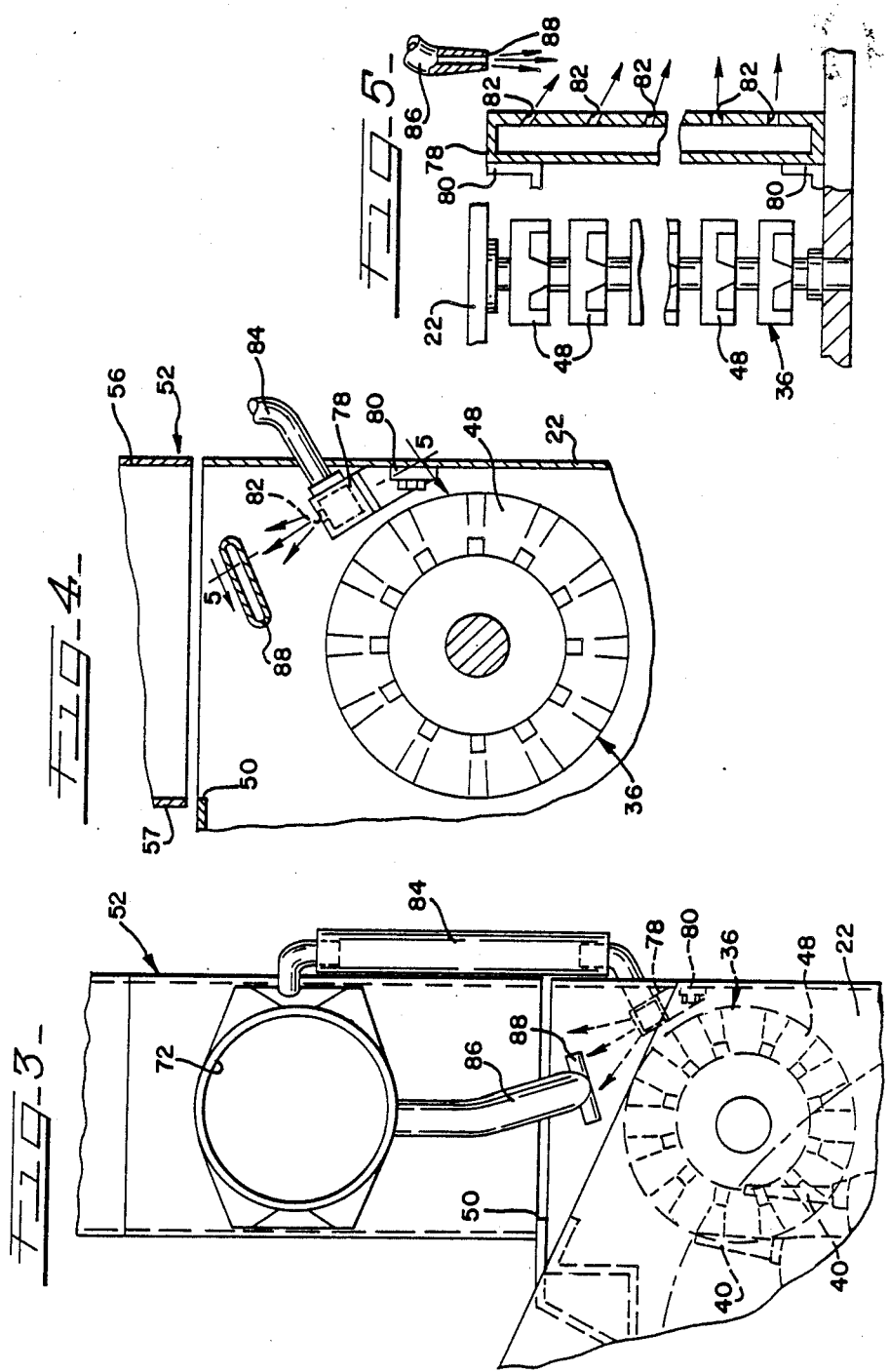

AIR SYSTEM FOR A COTTON HARVESTER

FIELD OF THE INVENTION

The present invention generally relates to cotton harvesters and, more particularly, to an air system which facilitates handling of harvested cotton in a manner enhancing operation of the cotton harvester.

BACKGROUND OF THE INVENTION

A typical cotton harvester includes a plurality of individual harvesting units mounted at a forward end of a mobile main frame. Each harvesting unit has one or more picker rotors, with each picker rotor having several individual rows of continuously rotating, circumferentially spaced cotton picker spindles. As the cotton harvester moves over a field of cotton plants, the rotating picker spindles harvest cotton from the plants. In some instances, the spindles are barbed or otherwise roughened to implement their affinity for cotton fiber.

The addition of moistening fluid to the picker spindles has been found to further increase the picking capacity of the picker spindles. Accordingly, a spindle moistening apparatus having a series of spindle moistening pads is typically arranged relative to the picker rotor. The moistening pads supply a moistening fluid, in one form or another, to each of the picking spindles prior to their entrance into the cotton plants. In a later part of the cotton picking cycle, the crop bearing picker spindles are withdrawn from the plant and carried into doffing relation with a doffer assembly. The addition of moistening fluid to the picker spindles further facilitates doffing of the cotton from the picker spindles.

The doffer assembly includes a plurality of vertically spaced, rotatably driven doffer pads. Each doffer pad is arranged relative to a picker spindle to remove or doff the cotton from the spindles and forcibly direct the cotton rearwardly into a discharge compartment or suction door. Following removal of the cotton, the spindles will again be presented to the spindle moistening apparatus for remoistening preparatory to continuation of the cotton picking cycle.

The rearwardly directed doffed cotton strikes a baffle or rear panel structure provided in the discharge compartment and then falls downwardly toward a discharge opening defined at the lower end of the discharge compartment. A duct extends upwardly from the discharge opening and connects the discharge compartment with a cotton receptacle on the harvester.

A stream of air discharged upwardly into the duct at a location downstream of the discharge opening creates a vacuum at the opening and induces a draft at a lower end of the discharge compartment. The cotton falling towards the opening is drawn therethrough and is directed upwardly into the duct. The cotton is ultimately directed into the cotton receptacle by the air stream.

The above-described cotton harvester has proved satisfactory in the majority of cotton harvesting conditions but has limited performance abilities under certain conditions. When harvesting high yield cotton, the doffer assembly discharges a larger than normal volume of cotton toward the discharge compartment. Most of the doffed cotton discharged from the doffer assembly strikes the rear panel structure in the discharge compartment and gravitationally falls toward the opening in the lower end of the discharge compartment. Some of the doffed cotton, however, rebounds from the rear panel structure and tends to repeat around the doffer assembly.

The rotary motion of the doffer pads throws some of the repeat cotton onto the ground. As will be appreciated, the doffed cotton thrown from the harvester onto the ground is lost and reduces the productivity of the cotton harvester. A large percentage of the repeat cotton, however, is again wrapped about the continuously rotating cotton spindles. Subsequent presentation of those spindles wrapped with repeat cotton to the moistener assembly increases the likelihood of blockage or damage to the moistener pads. Blockage or damage to the moistener pad inhibits adequate moistening of the picker spindles thereby reducing their affinity for cotton during the picking operation.

As will be appreciated by those skilled in the art, performance of a cotton harvester is adversely effected under moist cotton harvesting conditions. Moist cotton tends to wrap tightly upon the picker spindles. Tighter wrapping of the cotton on the picker spindles makes it more difficult to remove the cotton from the picker spindles by the doffer pads. As such, moist cotton also has a tendency to repeat around the doffer assembly and cause the same problems mentioned above.

The induced draft created at lower end of the discharge compartment is not always completely effective to draw doffed cotton from an upper end of the discharge compartment. This problem is furthermore aggravated when harvesting moist cotton. It has been observed that moist cotton has an increased tendency to clump and cause blockage at the upper end of the discharge compartment.

To reduce the cotton repeat problem in certain field conditions, it has been necessary to reduce the ground speed of the cotton harvester. Albeit time consuming, frequent cleanings of the discharge compartment reduces the likelihood of complete blockage in the discharged compartment. Both of these proposed solutions, however, adversely effect productivity of the cotton harvester when time is at a premium.

SUMMARY OF THE INVENTION

In view of the above, and in accordance with the present invention, there is provided an air system for a cotton harvester which facilitates handling of harvested cotton in damp or high yield cotton conditions. To effect such ends, the air system of the present invention inhibits doffed cotton from repeating around a rotating doffer assembly and propels rebounding cotton toward a discharge compartment on the cotton harvester. The air system of the present invention further contemplates directing a column of air downwardly behind the doffer assembly effectively creating an air barrier which inhibits rebounding cotton from repeating around the doffer assembly. This column of air further serves to evacuate an upper area of a discharge compartment in a manner increasing the interval between cleanings required for proper operation of the cotton harvester.

The cotton harvester with which the air system of the present invention finds utility is movable over a field of cotton plants and includes at least one cotton harvesting unit comprising a housing assembly having a harvesting mechanism rotatably mounted on the housing assembly for removing cotton from the cotton plants. The harvesting mechanism typically includes at least one picker rotor assembly and a doffer assembly. The picker rotor assembly has a plurality of rows of cotton picker spindles vertically arranged one above the other for harvesting cotton from the plants. The doffer assembly removes the cotton from the picker spindles in a conventional manner. The doffer assembly includes a series of vertically arranged doffer pads with each pad being rotatably moved about an axis relative to a row of cotton picker spindles in a manner removing or doffing the cotton therefrom.

An upright compartment structure is supported by the housing assembly rearwardly of each harvesting mechanism. The compartment structure receives cotton discharged from the harvesting mechanism and defines a discharge opening toward a lower end thereof through which cotton passes on its way to a cotton receptacle arranged on the cotton harvester. A duct structure extends from the discharge opening upwardly and generally rearwardly to the cotton receptacle.

The air system of the present invention includes an air nozzle which is located downstream of the discharge opening in the compartment structure. When operated, the air nozzle creates a suction effect at the opening in the compartment structure which is sufficient to draw cotton therethrough.

The air system of the present invention further includes an apparatus for inhibiting cotton from repeating around the doffer assembly In the preferred embodiment, such apparatus includes an elongated structural member arranged proximate to the harvesting mechanism. At its upper end, the structural member is connected to a source of pressurized air. This same source of pressurized air may be used to operate the air nozzle used to create a suction effect at the discharge opening in the compartment structure.

The structural member is fixedly supported at opposite ends to the housing assembly and has a hollow interior. Air is exhausted from the interior of the structural member toward the compartment structure in a manner inhibiting cotton discharged from the harvesting mechanism from repeating around the harvesting mechanism. In one form, a series of vertically spaced air jets are arranged along the length of the structural member. In a preferred form, a plurality of air jets arranged at an upper end of the structural member direct a flow of air rearwardly toward the compartment structure and generally downward to prevent an accumulation of cotton in an upper area of the compartment structure.

The air system of the present invention can readily embody another air nozzle which acts either in combination with or independently of the above-described structural member for directing a column of air downwardly into the compartment structure to entrain doffed cotton within the air column and inhibit an accumulation of doffed cotton in an upper area of the compartment structure. Such nozzle mechanism is connected to a source of pressurized air. In a preferred form, the same source of pressurized air is connected to both the nozzle mechanism for creating a suction at the discharge opening and the nozzle mechanism used to create a column of air. The downwardly directed column of air in the compartment structure effectively creates an air barrier extending along at least an upper portion of the compartment structure. The air barrier inhibits cotton rebounding from the compartment structure from repeating around the doffer assembly and entangling with the cotton picker spindles.

The air system of the present invention inhibits cotton from rebounding from the compartment structure and repeating about the doffer assembly even under those harvesting operations involving high yield cotton. The air system of the present invention further promotes a downwardly directed air stream in the compartment structure which reduces clumping and accumulation of cotton toward the upper end of the compartment structure. Reducing the amount of cotton repeating about the doffer assembly and effectively evacuating an upper end of the compartment structure, increases the interval between cleanings required to efficiently operate the cotton harvester and thereby increases the productivity of the cotton harvester in both damp and high yield cotton conditions.

Numerous other features and advantages of the present invention will become readily apparent from the following detailed description, the accompanying drawings and the appended claims.

BRIEF DESCRIPTION OF THE DRAWINGS

FIG. 1 is a side view of a portion of a multi-row cotton harvester including the air system of the present invention;

FIG. 2 is an enlarged top plan view of a cotton harvesting unit incorporating the principles of the present invention;

FIG. 3 is an enlarged top fragmentary view of the present invention;

FIG. 4 is a further enlarged top fragmentary view of the present invention; and

FIG. 5 is a sectional view taken along line 5—5 of FIG. 4.

DETAILED DESCRIPTION OF THE PRESENT INVENTION

While the present invention is susceptible of embodiments in various forms, there is shown in the drawings, and will hereinafter be described, presently preferred embodiments of the invention with the understanding that the present disclosure is to be considered as exemplifications of the invention which are not intended to limit the invention to the specific embodiments illustrated.

Referring now to the drawings, wherein like reference numerals indicate like parts throughout the several views, there is shown in FIG. 1 a cotton harvester 10 adapted for forward movement over a field planted with parallel rows of cotton. The harvester is generally of the type described in U.S. Pat. No. 2,259,894 to E. A. Johnson and incorporated herein by reference for purposes of orienting the structure of the present invention. The harvester 10 includes a ground wheel supported frame 12 with a cotton-receiving receptacle or basket 14 located rearwardly of an operator cab 16.

Supported on a forward end of the harvester 10 are a series of harvesting units 20. The harvesting units 20 are supported to allow them to be raised and lowered by suitable drivers (not shown) Turning to FIG. 2, each harvesting unit 20 comprises a housing assembly 22 and a harvesting mechanism 24.

As illustrated in FIG. 2, each housing assembly 22 defines a fore-and-aft extending plant passage 30. The passage 30 receives and permits a cotton plant to pass through the housing assembly as the harvester 10 advances over the cotton field.

The harvester mechanism 24 includes a pair of picker rotors 32 and 34, each rotor having a doffer assembly 36, 38, respectfully, associated therewith. Each picker rotor is rotatably mounted on the housing assembly 22 preferably on opposite sides of the plant passage 30.

Each rotor includes a series of vertically spaced, continuously rotating picker spindles 40 arranged in vertical rows. The picker spindles 40 on the picker rotors move along a predetermined path and extend into the respective plant passage 30 for the purpose of dislodging cotton from the cotton plants. The picker rotors 32, 34 cause the picker spindles 40 to carry the detached cotton inwardly from the plant passage to the respective doffer assembly associated therewith.

To promote cotton harvesting and during their course of travel, each picker spindle 40 is swept laterally beneath and in wiping relation with a moistening apparatus 44. In the illustrated embodiment, each moistening apparatus 44 is arranged forwardly of the respective picker rotors and includes a vertical column of moistening pads 46 which distribute a moistening fluid, such as water to the picker spindles As illustrated, the doffer assemblies 36, 38 are arranged on the opposite sides of the picker rotors 32, 34, respectively, from the moistening apparatus 44. Each doffer assembly 36, 38 is rotatably supported on the housing assembly 22 and includes a vertical column of doffer pads 48.

The doffer assemblies 36, 38 operate in a conventional manner. As the picker spindles 40 traverse along their predetermined path of travel, they are swept laterally and in wiping relation with a doffer pad 48 which removes the cotton from the spindles and forcibly discharges the cotton in a rearward direction through an elongated upright opening 50 defined at the rear of the housing assembly 22.

In the illustrated embodiment, each doffer assembly 36, 38 forcibly discharges or doffs the cotton rearwardly into an upright compartment 52 supported by the housing assembly 22. The compartment structure 52 may be substantially similar to that illustrated in U.S. Pat. No. 4,501,112 granted to G. N. Thedford et al., having common ownership with the present application, and incorporated herein by reference. As illustrated in FIG. 1, the compartment structure 52 has a generally U-shaped configuration.

In the embodiment illustrated in FIG. 1, each compartment structure is comprised of a descending leg section 53, an ascending leg section 54, and an elbow section 55 which joins sections 53 and 54 and gives structure 52 a generally U-shaped configuration. The descending leg section 53 has a pair of upright side walls 56, 57 (FIG. 4) that are transversely spaced on opposite sides of opening 50 defined by housing assembly 22. The side walls 56, 57 are joined by a rear panel 58 which is generally opposite the opening 50 in housing assembly 22. The descending leg section 53 also defines an outlet 60 generally located at its lower end. The elbow section 55 receives cotton from the descending leg outlet 60 and redirects the cotton toward the ascending leg section 54.

In the preferred embodiment, the ascending leg section 54 of each compartment structure 52 has a duct 64 upwardly extending therefrom and connected thereto. The duct 64 extends from a discharge end of leg section 54 to the cotton receptacle 14 mounted on the machine 10 for receiving cotton.

The air system of the present invention includes a source of pressurized air 70, such as a driven fan, which is suitably mounted on a machine 10. The air from fan 70 is directed by large supply conduits 72 to various parts of the machine. One of the conduits 72 is connected to an air nozzle 74. Nozzle 74 may be of the type disclosed in the above mentioned U.S. Pat. No. 4,501,112. Air nozzle 74 defines a jet nozzle output 76 suitably located downstream of the outlet 60 for discharging a stream of air upwardly through the discharge duct 64.

To inhibit doffed cotton from repeating around the doffer assemblies 36, 38, the air system of the present invention provides an upright elongated structural member 78 arranged proximate to each doffer assembly. As illustrated in FIGS. 4 and 5, the structural member 78 has a hollow or generally box-shaped cross section preferably measuring about 1 inch wide. The walled thickness of member 78 preferably measures about 3/16 inch. Each structural member is connected to the housing at its upper and lower ends by suitable flanges 80.

In a preferred form of the invention, structural member 78 defines a series of vertically spaced air jets or nozzles 82. The air jets 82 are intended to positively direct or propel doffed cotton toward the compartment structure 52. Alternatively, member 78 defines an elongated open sided groove opening rearwardly toward the compartment structure 52.

At its upper end, the structural member 78 is connected to a source of pressurized air. As illustrated, the structural member 78 is connected as by tubing 84 to the large supply conduit 72. By such construction, tubing 84 bleeds a portion of the pressurized air directed to nozzle 74 and redirects the air to the structural member 78.

Turning to FIG. 4 and 5, a plurality of air jets 82 provided at an upper end of the structural member 78 are directed both rearwardly and downwardly relative to the respective doffer assembly with which the structural member is associated. Such construction inhibits an accumulation of doffed cotton in an upper area of the compartment structure 52.

To positively retard an accumulation of doffed cotton in an upper area of the compartment structure 52, the air system of the present invention further contemplates directing a column of air downwardly in the toward the discharge outlet 60 at the lower end of the compartment structure 52. To effect such ends, an air nozzle structure is provided at an upper end of the compartment structure 52. The nozzle structure includes a spout 86 tapered from a relatively large end to an outlet 88 terminating toward an upper end of the descending leg section of the compartment structure 52 and facing generally downward toward discharge outlet 60.

The spout 86 is connected to a source of pressurized air. In the preferred embodiment, the spout 86 is suitably connected as by rigid tubing to and bleeds a small portion of the air directed to the nozzle 74.

In operation, cotton picked by the picker spindles 40 is doffed by the doffer assemblies 36, 38 and is forcibly directed rearward into the descending leg section 53 toward the rear panel 58 of the compartment structure 52 and from thence downwardly toward discharge outlet 60. Air is exhausted under some pressure from the jet nozzle output 76 of the nozzle 74 and is directed upwardly into the duct 64. Since air in the ascending leg section 54 of the compartment structure 52 is under some pressure, it creates an induced draft at the discharge opening 60. The induced draft at the discharge opening 60 tends to draw cotton therethrough and into the duct 64.

As mentioned, the doffed cotton directed rearwardly into the compartment structure 52 is directed toward the rear panel 58 and has a tendency to rebound therefrom toward the doffer assembly. To inhibit the rebounding doffed cotton from becoming entangled with the doffer assembly, the air directed from the structural member 78 tends to deflect and propel the rebounding cotton away from the doffer assembly. In a preferred form, the air jets 82 arranged toward the upper end of the structural member 78 are designed to evacuate the upper end of the compartment structure 52 to thereby inhibit an accumulation of cotton toward the upper end thereof.

To provide a positive evacuation of the upper end of the chamber 52, spout 86 downwardly directs a column of air toward the discharge outlet 60 in a manner entraining the doffed cotton within the column of air. At least at the upper end of compartment structure 52, the downwardly directed column of air further provides an air barrier which inhibits rebounding cotton from repeating around the doffer assembly. The doffed cotton entrained within the column of air is positively directed downwardly toward the discharge opening 60 from whence it moves into the duct 64 toward the cotton receptacle.

It will be understood that the air system of the present invention can readily embody the structural member 78 and spout 86 which act, either individually or in combination, to prevent rebounding cotton from repeating around the doffer assembly. Moreover, the air system of the present invention can be used to evacuate the upper end of the compartment structure 52 to enhance cotton handling abilities for a cotton harvester in a manner leading to increased cotton-harvesting capacity.

This invention has been described in terms of specific embodiments set forth in detail, but it should be understood that these are by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

What is claimed is:

1. An air system for a cotton harvester movable over a field of cotton plants and including a cotton harvester unit comprising a housing assembly, vertically disposed harvesting means rotatably mounted on said housing assembly for removing cotton from the cotton plants, an upright compartment structure supported by the housing assembly for receiving cotton discharged from the harvesting means and having a discharge outlet toward a lower end thereof through which cotton passes on its way to a cotton receptacle, said air system comprising:
air operated nozzle means connected to a source of pressurized air and located downstream of said outlet for creating a suction effect at said outlet sufficient to draw cotton therethrough; and
air directing means arranged within said compartment structure proximate to and opening along substantially the entire length of said harvesting means to said compartment structure for inhibiting cotton discharged from and along substantially the entire length of the harvesting means from repeating therearound.

2. The air system according to claim 1 further including means for bleeding a portion of the pressurized air from the nozzle means to said operative means such that a common source of pressurized air is used to operate both said nozzle means and said operative means.

3. The air system according to claim 1 wherein said air directing means comprises an upright, elongated structural member and a series of air jets arranged one above another for positively directing cotton toward said compartment structure.

4. An air system for a cotton harvester adapted for movement over a field of cotton plants, said cotton harvester including a cotton harvester unit comprising a housing assembly, spindle means rotatably mounted on said housing assembly for removing cotton from the cotton plants, and doffer means rotatably mounted on said housing assembly for doffing cotton from the spindle means, an upright compartment structure supported by the housing assembly into which doffed cotton is received, said structure defining an upper area and an opening arranged toward a lower area thereof through which cotton passes, duct means leading upwardly from said opening for directing cotton toward a cotton receptacle, said air system comprising:
first operative means connected to a source of pressurized air for discharging a stream of air upwardly into said duct means in a manner creating a vacuum at said opening sufficient to draw cotton therethrough; and
second operative means arranged toward an upper area of said compartment structure and connected to said source of pressurized air for directing a column of air downwardly into said compartment structure to entrain the doffed cotton within the air column and inhibit an accumulation of doffed cotton in an upper area of the compartment structure.

5. The air system according to claim 4 wherein said first operative means includes nozzle means arranged within said duct means.

6. The air system according to claim 5 further including means for bleeding a portion of the pressurized air from the nozzle means to said second operative means.

7. The air system according to claim 4 wherein said second operative means includes nozzle means arranged toward an upper area of said compartment structure rearwardly of said doffer assembly.

8. An air system for a cotton harvester movable over a field of cotton plants and including a cotton harvester unit comprising a housing assembly, a spindle rotor assembly rotatably mounted on said housing assembly for removing cotton from the cotton plants, said spindle rotor assembly including a plurality of rows of cotton picker spindles, said picker spindles being vertically arranged one above the other, a doffer assembly for removing cotton from the spindle rotor assembly, said doffer assembly including a series of vertically arranged doffer pads, each doffer pad being rotatably moved about an axis relative to a row of cotton picker spindles in a manner removing the cotton therefrom and discharging the removed cotton into an upright compartment structure, said compartment structure being supported by the housing assembly and having an upper end and an opening at a lower end thereof through which cotton passes, and duct means leading away from said compartment structure toward a cotton receptacle, said air system comprising:
means connected to a source of air and located downstream of said opening for creating a suction effect at said opening tending to draw cotton therethrough;

means connected to said source of air and arranged within said upright compartment structure alongside said doffer assembly and extending of substantially coequal length therewith for facilitating movement of the cotton discharged from the doffer assembly toward the compartment structure in a manner inhibiting cotton from repeating around the doffer assembly; and means connected to said source of air for directing a column of air downwardly into said compartment structure to entrain the cotton discharged from the doffer assembly within the air column and inhibit an accumulation of cotton toward an upper end of the compartment structure.

9. The air system according to claim 8 wherein said means for directing a column of air includes nozzle means arranged toward an upper area of said compartment structure.

10. An air system for a cotton harvester movable over a field of cotton plants and including a cotton harvester unit comprising a housing assembly, harvesting means rotatably mounted on said housing assembly for removing cotton from the cotton plants, an upright compartment structure supported by the housing assembly for receiving cotton discharged from the harvesting means and having a discharge outlet toward a lower end thereof through which cotton passes on its way to a cotton receptacle, said air system comprising:

air operated nozzle means connected to a source of pressurized air and located downstream of said outlet for creating a suction effect at said outlet sufficient to draw cotton therethrough; and operative means arranged proximate to said harvesting means for inhibiting cotton discharged from the harvesting means from repeating around the harvesting means, said operative means comprising an upright, elongated and hollow structural member fixedly supported at opposite ends to said housing assembly and connected to a source of pressurized air, said hollow structural member defining a series of vertically spaced air jet arranged along the length of said structural member for positively directing cotton toward said compartment structure.

11. The air system according to claim 10 wherein a plurality of air jets arranged at an upper end of said structural member direct a flow of air rearwardly toward said compartment structure and generally downward to inhibit an accumulation of cotton in an upper area of the compartment structure.

12. An air system for a cotton harvester movable over a field of cotton plants and including a cotton harvester unit comprising a housing assembly, a spindle rotor assembly rotatably mounted on said housing assembly for removing cotton from the cotton plants, said spindle rotor assembly including a plurality of rows of cotton picker spindles, said spindles being vertically arranged one above the other, a doffer assembly for removing cotton from the spindle rotor assembly, said doffer assembly including a series of vertically arranged doffer pads, each doffer pad being rotatably moved about an axis relative to a row of cotton picker spindles in a manner removing the cotton therefrom, and discharging the removed cotton into an upright compartment structure supported by the housing assembly and having an opening at a lower end thereof through which cotton passes, and duct means leading away from said compartment structure toward a cotton receptacle, said air system comprising:

means connected to a source of air and located downstream of said opening for creating a suction effect at said opening tending to draw cotton therethrough;

means arranged proximate said doffer assembly for facilitating movement of the cotton discharged from the doffer assembly toward the compartment structure, said means for facilitating movement of the cotton comprising an upright hollow structure connected to source of pressurized air and defining a plurality of air jet means for facilitating of and positively propelling the cotton discharged from the doffer assembly toward the compartment structure in a manner inhibiting cotton from repeating around the doffer assembly; and means connected to a source of air for directing a column of air downwardly in said compartment structure to entrain the cotton discharged from the doffer assembly within the air column and inhibit an accumulation of cotton toward an upper end of the compartment structure.

* * * * *